(12) United States Patent
Sakurai et al.

(10) Patent No.: US 11,400,538 B2
(45) Date of Patent: Aug. 2, 2022

(54) ARTICULATED WELDING ROBOT

(71) Applicant: Kobe Steel, Ltd., Kobe (JP)

(72) Inventors: Yasuharu Sakurai, Fujisawa (JP); Yuki Shika, Ibaraki (JP); Motoaki Murakami, Fujisawa (JP); Taichi Igarashi, Fujisawa (JP); Tatsuji Minato, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 457 days.

(21) Appl. No.: 16/476,672

(22) PCT Filed: Jan. 15, 2018

(86) PCT No.: PCT/JP2018/000788
§ 371 (c)(1),
(2) Date: Jul. 9, 2019

(87) PCT Pub. No.: WO2018/142891
PCT Pub. Date: Aug. 9, 2018

(65) Prior Publication Data
US 2019/0321906 A1      Oct. 24, 2019

(30) Foreign Application Priority Data

Feb. 1, 2017   (JP) .............................. JP2017-017112

(51) Int. Cl.
*B23K 9/12*         (2006.01)
*B23K 11/31*        (2006.01)
*B25J 9/06*         (2006.01)

(52) U.S. Cl.
CPC .............. *B23K 9/121* (2013.01); *B23K 11/31* (2013.01); *B25J 9/06* (2013.01)

(58) Field of Classification Search
CPC .......... B23K 31/02; B23K 9/133; B23K 9/32; B23K 9/121; B23K 9/12; B23K 9/173; B23K 11/31; B25J 19/0025; B25J 9/06
See application file for complete search history.

(56) References Cited

U.S. PATENT DOCUMENTS 5,013,887 A * 5/1991 Gold .................. B23K 9/12
                                          219/124.34
5,198,736 A   3/1993 Azuma et al.
(Continued)

FOREIGN PATENT DOCUMENTS

CN        1921989 A       2/2007
CN      203734234 U       7/2014
(Continued)

OTHER PUBLICATIONS

International Search Report dated Feb. 6, 2018 in PCT/JP2018/000788 filed on Jan. 15, 2018.

*Primary Examiner* — Dana Ross
*Assistant Examiner* — Kuangyue Chen
(74) *Attorney, Agent, or Firm* — Oblon, McClelland, Maier & Neustadt, L.L.P.

(57) ABSTRACT

Provided is an articulated welding robot that includes an articulated arm in which a plurality of arm parts are linked via a drive shaft. A welding wire is disposed along the articulated arm. In at least one of the arm parts a depression is formed that forms a hollow on the inner side of the arm. At least a portion of the welding wire is accommodated in the depression.

6 Claims, 13 Drawing Sheets

(56) References Cited

U.S. PATENT DOCUMENTS

| | | | |
|---|---|---|---|
| 2002/0130513 A1* | 9/2002 | Berninger | F16L 3/10 |
| | | | 285/45 |
| 2004/0261562 A1 | 12/2004 | Haniya et al. | |
| 2006/0294628 A1 | 12/2006 | Iwai et al. | |
| 2010/0229671 A1 | 9/2010 | Haniya et al. | |
| 2015/0007681 A1 | 1/2015 | Murakami | |
| 2016/0221184 A1* | 8/2016 | Sueyoshi | B25J 9/047 |
| 2017/0014998 A1* | 1/2017 | Langenfeld | B25J 9/104 |
| 2019/0061145 A1* | 2/2019 | Ohtsubo | B25J 19/0025 |

FOREIGN PATENT DOCUMENTS

| | | | | |
|---|---|---|---|---|
| JP | 4-360787 A | | 12/1992 | |
| JP | 04360787 A | * | 12/1992 | |
| JP | 2006-289589 A | | 10/2006 | |
| JP | 2006289589 A | * | 10/2006 | H02G 11/00 |
| JP | 4142304 B2 | | 9/2008 | |
| JP | 2010-36253 A | | 2/2010 | |
| JP | 2011-67893 A | | 4/2011 | |
| JP | 5715198 B2 | | 5/2015 | |
| JP | 2016-107355 A | | 6/2016 | |
| JP | 2016107355 A | * | 6/2016 | |
| WO | WO 2006/112059 A1 | | 10/2006 | |

\* cited by examiner

F I G. 11
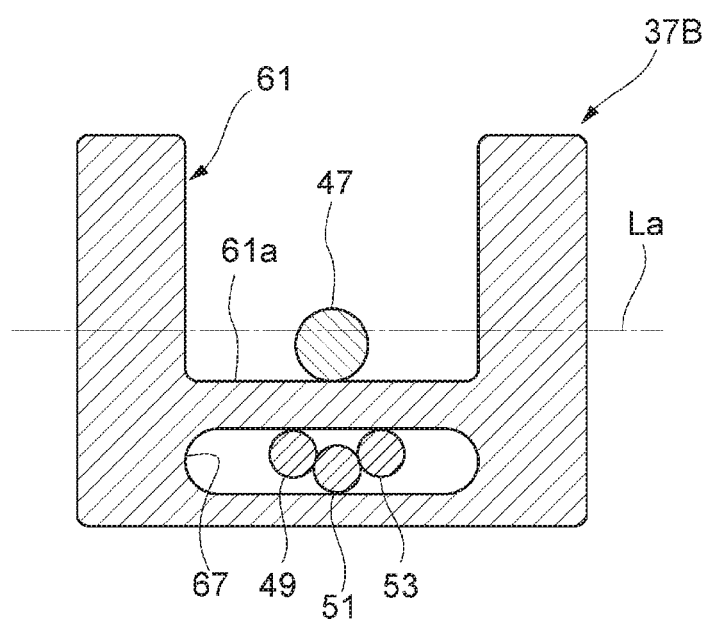

ARTICULATED WELDING ROBOT

TECHNICAL FIELD

The present invention relates to an articulated welding robot.

BACKGROUND ART

There is known an articulated welding robot for arc welding generally including a welding torch at a distal end of an articulated arm (for example, refer to Patent Documents 1 to 3). Each of articulated welding robots according to Patent Documents 1 to 3 includes a swinging portion provided so as to be capable of swinging on a base, arms provided above the swinging portion so as to be capable of being rotationally driven, and a welding torch attached to a distal end of the arm. The articulated welding robot is configured to be capable of carrying out a desired welding operation by the swinging portion and respective joints of the arms being driven.

A welding wire is supplied to this articulated welding robot in a state in which the welding wire is inserted through a conduit cable, and is disposed up to the welding torch along the respective arms.

CITATION LIST

Patent Document

Patent Document 1: JP 5715198 B2
Patent Document 2: JP 4142304 B2
Patent Document 3: JP 2011-67893 A

SUMMARY OF THE INVENTION

Problem to be Solved by the Invention

However, in a case in which the welding wire is disposed along the respective arms of the articulated welding robot as described in Patent Document 1, if a curvature radius of a curve of the welding wire decreases, the welding wire may tend to be bent. The bending tendency of the welding wire generates an unintended displacement at a distal end position (welding position) of the welding wire during the welding, resulting in a cause for a decrease in a welding quality.

Moreover, the articulated welding robot described in Patent Document 2 is configured so that a wrist portion is provided in a distal end of the arm, and a motor and a reducer are provided for the wrist portion. A hollow shaft reducer provided with a hollow portion passing through from a counter load side to a load side is used in the wrist portion. The welding wire is disposed through the hollow portion, thereby reducing bending caused by an operation of the wrist portion, and preventing the welding wire from being wound around the arms.

However, the use of the hollow shaft reducer causes an increase in cost. Moreover, even if such a configuration that a motor disposed so as to be radially offset is used, and the motor is connected to the reducer via gears is employed in place of the hollow shaft motor, a rotation shift occurs due to a backlash of the gears. As a result, a swing of the arm tends to occur, and a positioning precision of the welding position decreases. Further, if the hollow reducer is not used, the reducer needs to be offset with respect to a swing shaft of the wrist portion, and the swing shaft of the wrist portion and the reducer need to be connected with each other via gears or the like. Also in this case, the positioning precision of the welding position may be decreased by a backlash of the gears, and the welding quality may thus decrease.

A technology that solves the above-mentioned problem is described in Patent Document 3. In the welding robot described in Patent Document 3, a wire feed/supply device is attached to a support body provided in a proximal end portion of an upper arm via a bracket that turns. There is provided such a configuration that the bracket turns when a torch cable is pulled from and pressed against the wire feed/supply device caused by a change in the posture of the welding robot, thereby permitting approach and separation of the wire feed/supply device to and from the support body. However, the wire feed/supply device is disposed on the support body on the proximal end portion of the upper arm in this configuration. Thus, the conduit cable through which the welding wire is inserted needs to be extended from a rear portion (on a counter-welding-torch side) of the wire feeding/supply device toward the outside of the robot in order to increase an operation angle between a lower arm and the upper arm of the welding robot. Therefore, the conduit cable for wire feeding/supplying may move largely during the operation of the welding robot, the conduit cable may be damaged by its own inertial force, and the welding operation may be stopped.

Moreover, if the operation angle between the lower arm and the upper arm of the welding robot is restricted, the welding wire can be extended from the lower arm and a robot fixed portion to the outside of the robot without changing the disposition position of the wire feed/supply device in Patent Document 3 is maintained. However, convenience of the robot is largely spoiled due to the restriction on the operation angle of the arms in this case.

The present invention has been made in view of the above-mentioned points, and therefore has an object to provide an articulated welding robot that can avoid the decrease in the precision of the distal end position of the welding wire, and can reduce the interference with a workpiece in a vicinity of the robot wrist, thereby being capable of preventing damage of the conduit cable and the welding wire while rigidity of the arms is secured even in a configuration at a low cost.

Means for Solving the Problem

One aspect according to the present invention is an articulated welding robot including an articulated arm in which a plurality of arm parts are linked via drive shafts, where a welding wire is disposed along at least any of the arm parts, where a depression hollowed toward an arm axial center is formed in at least a part of an arm outer periphery of any of the arm parts, and where at least a part of the welding wire is accommodated in the depression.

With this articulated welding robot, the welding wire can be prevented from being curved at a small curvature radius by accommodating the welding wire in the depression when the robot is driven, and the welding wire can thus be prevented from tending to bend. Moreover, each of drive components such as a reducer does not need to be formed into a specific shape having a hollow portion, the cost can be reduced, and rigidity of the arm parts can be secured. Further, influence of a backlash of gears does not exist, and the welding position can highly precisely be positioned, thereby being capable of increasing the welding quality.

Moreover, it is preferred that a drive shaft for rotating the arm part in which the depression is formed about the arm axial center is connected to the arm part, and a bottom surface of the depression is formed at a depth from the arm outer periphery of the arm part to the arm axial center.

With this configuration, even when the arm part is oriented toward various directions, the welding wire can follow the motion of the arm part at a low resistance without being detached from the depression. Moreover, the welding wire is disposed to the depth to the arm axial center, the welding wire is thus not locally bent at a small curvature radius even when the posture of the welding wire is changed as a result of the drive of the arm part, and the bending tendency is not generated in the welding wire.

Moreover, the depression is preferably formed along the arm axial center.

With this configuration, the welding wire is disposed in the depression along a longitudinal axis of a second arm part, thereby being capable of avoiding interference between the welding wire and peripheral members.

Moreover, an opposed-side depression hollowed toward the arm axial center is preferably formed on an opposite side of a forming side of the depression on the arm outer periphery in the arm part in which the depression is formed.

With this configuration, the arm part can be further hollowed by the opposed-side depression, an effect of a reduction in an inertial force as a result of the reduction in weight of the arm part can realize a high-speed movement of the articulated welding robot. Moreover, cables and hoses can be accommodated in the opposed-side depression, and a degree of freedom of the disposition of the welding wire and other cables and hoses can be increased.

Moreover, a support member for fixing the welding wire is preferably provided in at least a part of the arm part in which the depression is formed.

With this configuration, even when the arm part is driven, the state in which the welding wire is always accommodated in the depression can be maintained stably.

Moreover, the welding wire is preferably inserted through the conduit cable.

With this configuration, the welding wire is protected by the conduit cable.

Moreover, the conduit cable is preferably inserted through one composite cable containing at least any one of a gas hose for supplying shielding gas, a cooling water hose for circulating cooling water, and a power cable for supplying a welding current.

With this configuration, respective supplies of the welding wire, the shielding gas, and the welding current to the welding torch of the articulated welding robot, the circulation of the cooling water, and the like can be performed by one torch cable, and a complex configuration of a supply path is not necessary Effects of the Invention The present invention can avoid the decrease in the precision of the distal end position of the welding wire, can reduce the interference with a workpiece in the vicinity of the robot wrist, and can prevent damage of the conduit cable and the welding wire while rigidity of arms are secured even with a configuration at a low cost.

BRIEF DESCRIPTION OF DRAWINGS

FIG. 11 is a cross sectional view of a fourth configuration example of the articulated robot corresponding to the cross section taken along the line V-V of the upper arm shown in FIG. 4.

DESCRIPTION OF EMBODIMENTS

A detailed description will now be given of an embodiment of the present invention referring to drawings. It should be noted that the present invention is not limited to the embodiment described below.

Figure 1:
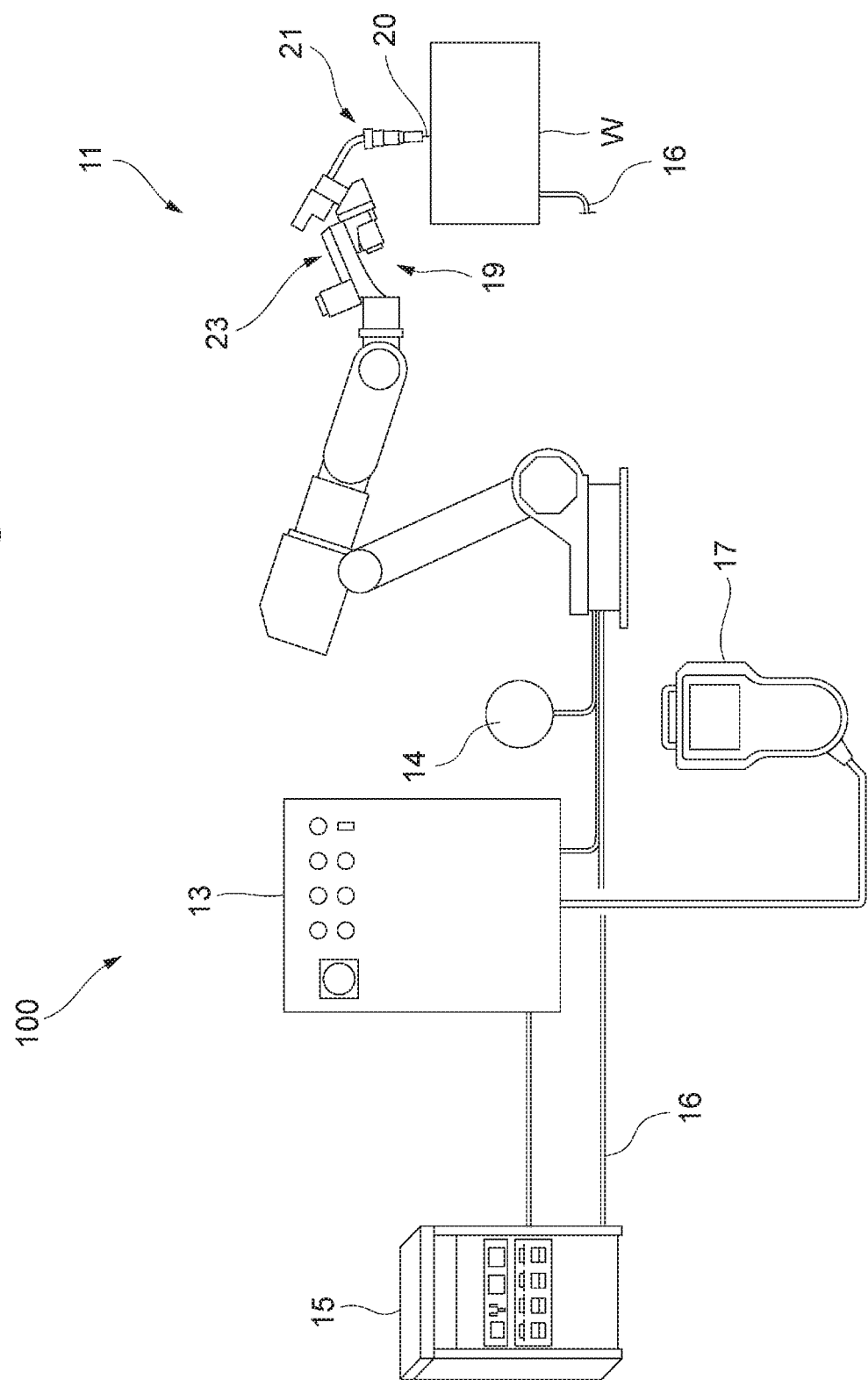
FIG. 1 is an overall configuration view of a welding system.

FIG. 1 is an overall configuration view of a welding system.

The welding system 100 includes an articulated welding robot 11, a control device 13, a welding power supply 15, and a teaching controller 17. An end effector 19 is connected to a distal end shaft of the articulated welding robot 11. The end effector 19 includes a welding torch 21, and may include a two-axis weaver 23 for swinging the welding torch 21 about two axes orthogonal to each other as in the illustrated example. Other tool such as a cutter may be used as the end effector 19 in addition to the welding torch 21.

Welding by this articulated welding robot 11 is carried out by using the control device 13 to drive the articulated welding robot 11, moving the welding torch 21 to a welding position, and using the welding power supply 15 to control a welding current and an arc voltage, thereby generating arc between a welding wire 20 at a distal end of the welding torch 21 and a workpiece W.

The control device 13 drivers the articulated welding robot 11 based on teaching data input from the teaching controller 17. This control device 13 is a computer device that reads a program stored in a storage unit such as a ROM, a RAM, and a hard disk, and executes the program by a CPU, thereby controlling respective parts of the welding system 100.

The welding wire 20, which is a consumable electrode such as a flux-cored wire and a solid wire, is drawn out from a wire pack 14 by a wire feed/supply device, not shown, thereby being supplied to the distal end of the welding torch 21. The welding power supply 15 is connected to the welding torch 21 and the workpiece W via a power supply cable 16. The welding current is supplied via a power cable disposed in the articulated welding robot 11 to the welding torch 21 in accordance with a command from the control device 13. Moreover, shielding gas is supplied to the welding torch 21, thereby achieving protection from involvement of the atmosphere during the welding. Moreover, cooling water for torch cooling is also supplied to the welding torch 21.

The control device 13 supplies the welding current between the distal end of the welding wire 20 and the workpiece W from the welding power supply 15, thereby generating the arc at the distal end of the welding torch 21 covered with a shielding gas atmosphere. Then, the welding torch 21 at which the arc is generated is moved by the articulated welding robot 11 along a trajectory taught in advance. As a result, the workpiece W is welded.

A more detailed description will now be given of the configuration of the articulated welding robot 11 of the welding system 100.

First Configuration Example

Figure 2:
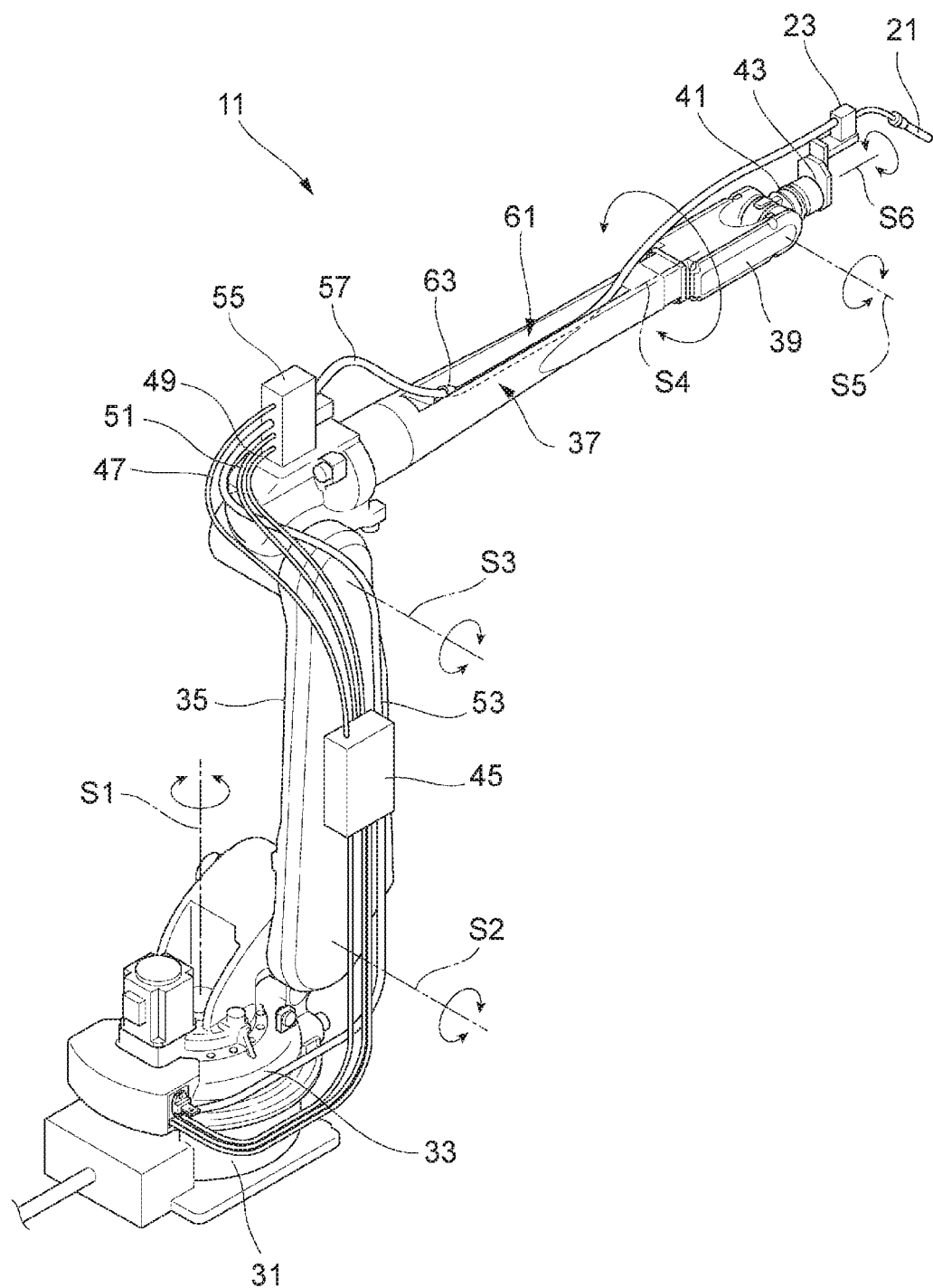
FIG. 2 is an exterior perspective view showing an articulated welding robot in a first configuration example.
Figure 3:
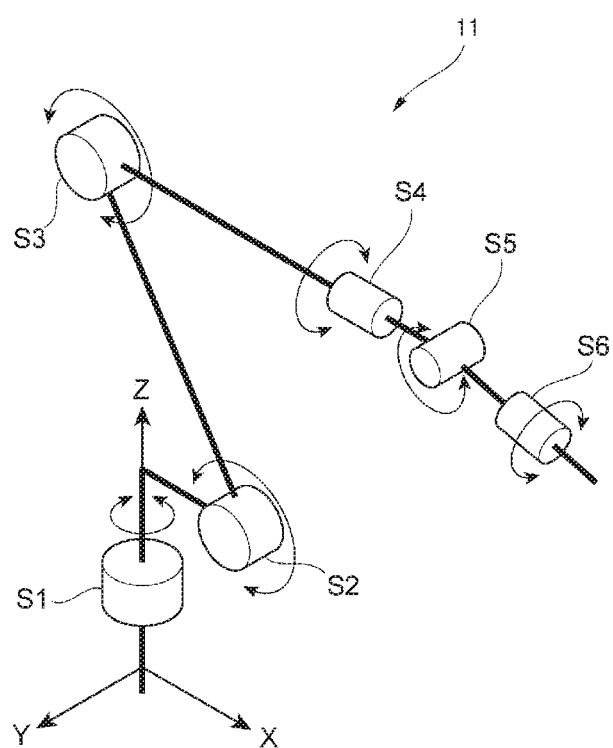
FIG. 3 is an illustrative view schematically showing drive shafts of the articulated welding robot shown in FIG. 2.

FIG. 2 is an exterior perspective view showing the articulated welding robot in a first configuration example, and FIG. 3 is an illustrative view schematically showing drive shafts of the articulated welding robot shown in FIG. 2.

The articulated welding robot 11 includes an articulated arm in which a multiple arm parts are coupled to one another via the drive shafts, and a general six-axis robot having six drive shafts is shown in this example. The articulated welding robot 11 may be a seven-axis robot or a multi-axis robot having other configuration, for example, in addition to the exemplified 6-axis robot.

The articulated welding robot 11 includes a base 31 fixed to an installation surface, a swinging portion 33 provided so as to be capable of swinging about a first drive shaft S1 on the base 31, a lower arm (arm part) 35 one end portion of which is coupled to the swinging portion 33 via a second drive shaft S2, and which is rotational about the second drive shaft S2, an upper arm (arm part) 37 connected to the other end portion of the lower arm 35 via a third drive shaft S3, a wrist swinging portion 39 provided on the upper arm 37, and rotatable about an arm axis by a fourth drive shaft S4, a wrist bending portion 41 connected to the wrist swinging portion 39 via a fifth drive shaft S5, and a wrist rotating portion 43 connected to a distal end of the wrist bending portion 41 via a sixth drive shaft S6. The lower arm 35, the upper arm 37, the wrist swinging portion 39, the wrist bending portion 41, and the wrist rotating portion 43 construct the articulated arm.

Each of the first drive shaft S1 to the sixth drive shaft S6 of the articulated welding robot 11 is driven by a drive motor such as a servomotor, not shown. Drive signals are input respectively to these drive motors from the control device 13 (refer to FIG. 1), thereby controlling rotation angles of the respective drive shafts. As a result, the welding torch 21 can be positioned at a predetermined posture in an XYZ space.

It should be noted that the above-mentioned two-axis weaver 23 is attached between the sixth drive shaft S6 of the wrist rotating portion 43, which is the most distal end shaft of the articulated arm, and the welding torch 21 in this configuration, but the configuration may not include the two-axis weaver 23. The welding torch 21 of this configuration is supported by the two-axis weaver 23 so that the distal end of the torch can swing in two axis directions.

A wire feed/supply device 45 for feeding/supplying the consumable electrode (hereinafter referred to as welding wire 20) to the welding torch 21 is mounted on the articulated welding robot 11. A case where the wire feed/supply device 45 is provided in a middle portion in a longitudinal direction of the lower arm 35 is shown in the illustrated example. The wire feed/supply device 45 is connected to the control device 13 (refer to FIG. 1) by a communication line, not show, and controls feed/supply of the welding wire 20 in accordance with a command signal from the control device 13. The welding wire 20 is inserted through an insertion hole of a conduit cable 47, and is fed/supplied through being drawn out in the insertion hole. As a result, a handling property of the welding wire 20 can be increased while the welding wire 20 is prevented from being damaged.

The wire feed/supply device 45 may be disposed, for example, on a proximal end side (a non-rotation side of the fourth drive shaft S4) of the upper arm 37 in a vicinity of a cable adaptor 55 described later or on a side of the lower arm 35 closer to the first drive shaft S1 in addition to the above-mentioned configuration provided on the lower arm 35.

The shielding gas supplied to the welding torch 21 is supplied from a gas supply device, not shown, through a gas hose 49. Similarly, the cooling water is circulated from a cooling water circulation device, not shown, via a cooling water hose 51. The welding current output from the welding power supply 15 is supplied via the power cable 53.

The conduit cable 47, the gas hose 49, the cooling water hose 51, and the power cable 53 are disposed from the base 31 to the cable adaptor 55 provided in a neighborhood of the third drive shaft S3 of the upper arm 37 along a periphery of the base 31 and the swinging portion 33 and the lower arm 35. The conduit cable 47, the gas hose 49, the cooling water hose 51, and the power cable 53 are integrated into one torch cable 57, which is a composite cable, in the cable adaptor 55. This torch cable 57 is disposed between the cable adaptor 55 and the welding torch 21.

A description is now given of a detailed configuration of the upper arm 37.

Figure 4:
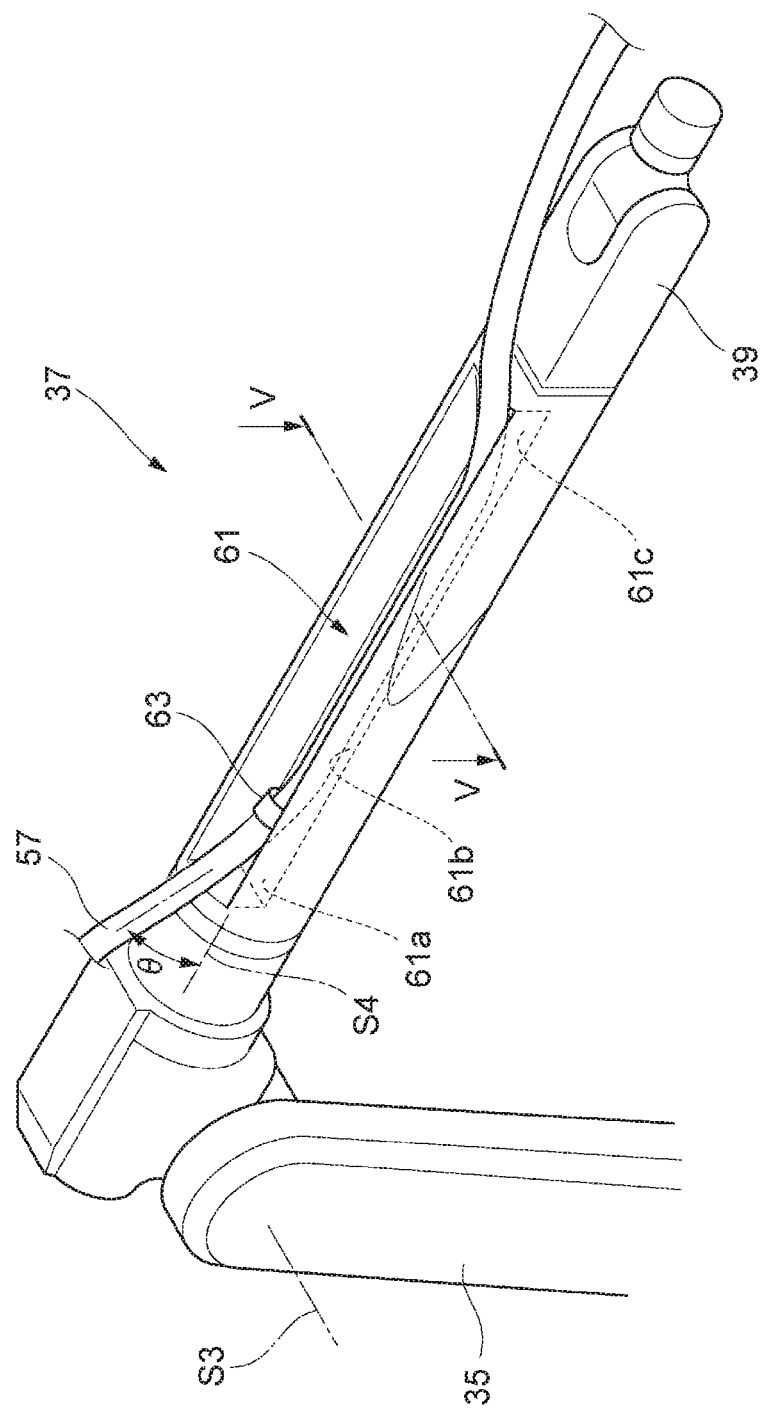
FIG. 4 is a perspective view of a principal part of an upper arm.

FIG. 4 is a perspective view of a principal part of the upper arm 37.

A depression 61 hollowed from an outer peripheral surface toward the fourth drive shaft S4, which corresponds to an arm axial center, is formed in at least a part of an arm outer periphery of the upper arm 37 along the arm axial center of the upper arm 37. The depression 61 is a bottomed depression, and at least a part of the torch cable 57 is accommodated in the depression along a longitudinal direction of the depression 61.

A support member 63 for supporting the torch cable 57 in a state in which the torch cable 57 is accommodated in the depression 61 is provided in a proximal end side end portion 61*a* of the upper arm 37 on a side of the third drive shaft S3 in the depression 61. The support member 63 only needs to support the torch cable 57, and an annular member such as a tie band can be used. Moreover, the support member 63 may be a member for fixing the torch cable 57 to the upper arm 37, but is preferably a member for supporting the torch cable 57 while a gap to the torch cable 57 is provided so as to move the torch cable 57 in a cable axial direction. In this case, a curve generated in the torch cable 57 does not form a bending having a small curvature radius, and the welding wire can be prevented from tending to bend. A decrease in the precision of the distal end position of the welding wire can be avoided by preventing such a bending tendency. It should be noted that the support member 63 may be a pressing member for pressing the torch cable 57 in the depression 61.

The support member 63 inclines the torch cable 57 from the proximal end side of the upper arm 37 with respect to the fourth drive shaft S4, thereby introducing the torch cable 57 into the depression 61. An outer peripheral surface of the torch cable 57 introduced while inclined is pressed against a bottom surface 61b of the depression 61 due to elasticity of the cable itself. That is, the torch cable 57 is accommodated in the depression 61 while the torch cable 57 is energized toward the bottom surface 61b by the support member 63 fixing the torch cable 57 to the upper arm 37.

Figure 5:
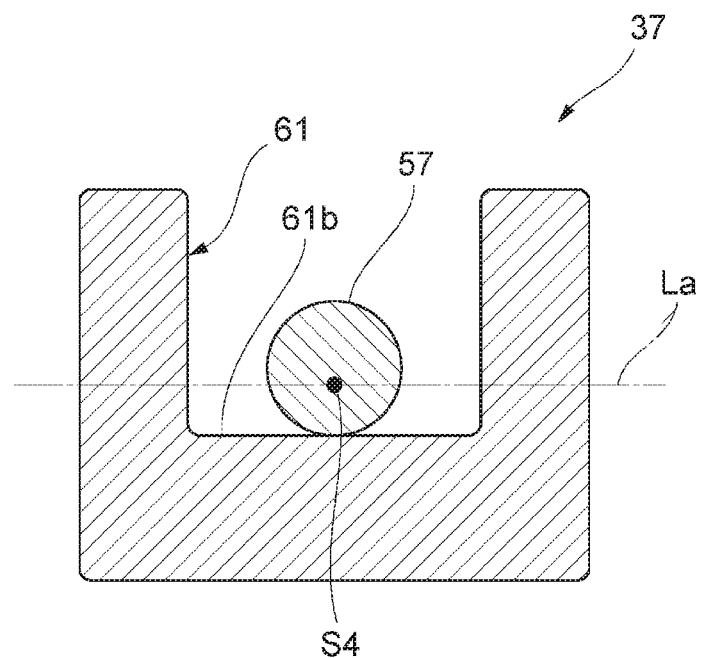
FIG. 5 is a cross sectional view taken along the line V-V of the upper arm shown in FIG. 4.

FIG. 5 is a cross sectional view taken along the line V-V of the upper arm 37 shown in FIG. 4. The depression 61 is formed to a depth from the outer peripheral surface of the upper arm 37 to the axial center of the fourth drive shaft S4 in the upper arm 37. The bottom surface 61b of the depression 61 is formed at a position deeper than the axial center of the fourth drive shaft S4, and an axial center of the torch cable 57 pressed against the bottom surface 61b is thus in a neighborhood of the fourth drive shaft S4 or at a position coincident with the fourth drive shaft S4 in the illustrated example. It should be noted that a long dashed short dashed line in the figure is a center line La passing through the fourth drive shaft S4 of the upper arm 37.

As described above, the axial center position of the torch cable 57 does not always need to coincide with the fourth drive shaft S4 in the depression 61, and only needs to be accommodated in the internal space of the depression 61. A centrifugal force acts on the torch cable 57 accommodated in the depression 61 when the upper arm 37 is driven to rotate about the fourth drive shaft S4. Even if this centrifugal force acts, the torch cable 57 is supported on the bottom surface 61b of the depression 61 by the support member 63 (refer to FIG. 4), and at least a part of the torch cable 57 is thus accommodated in the depression 61. Thus, a protrusion of the torch cable 57 from the depression 61 is suppressed.

Figure 6:
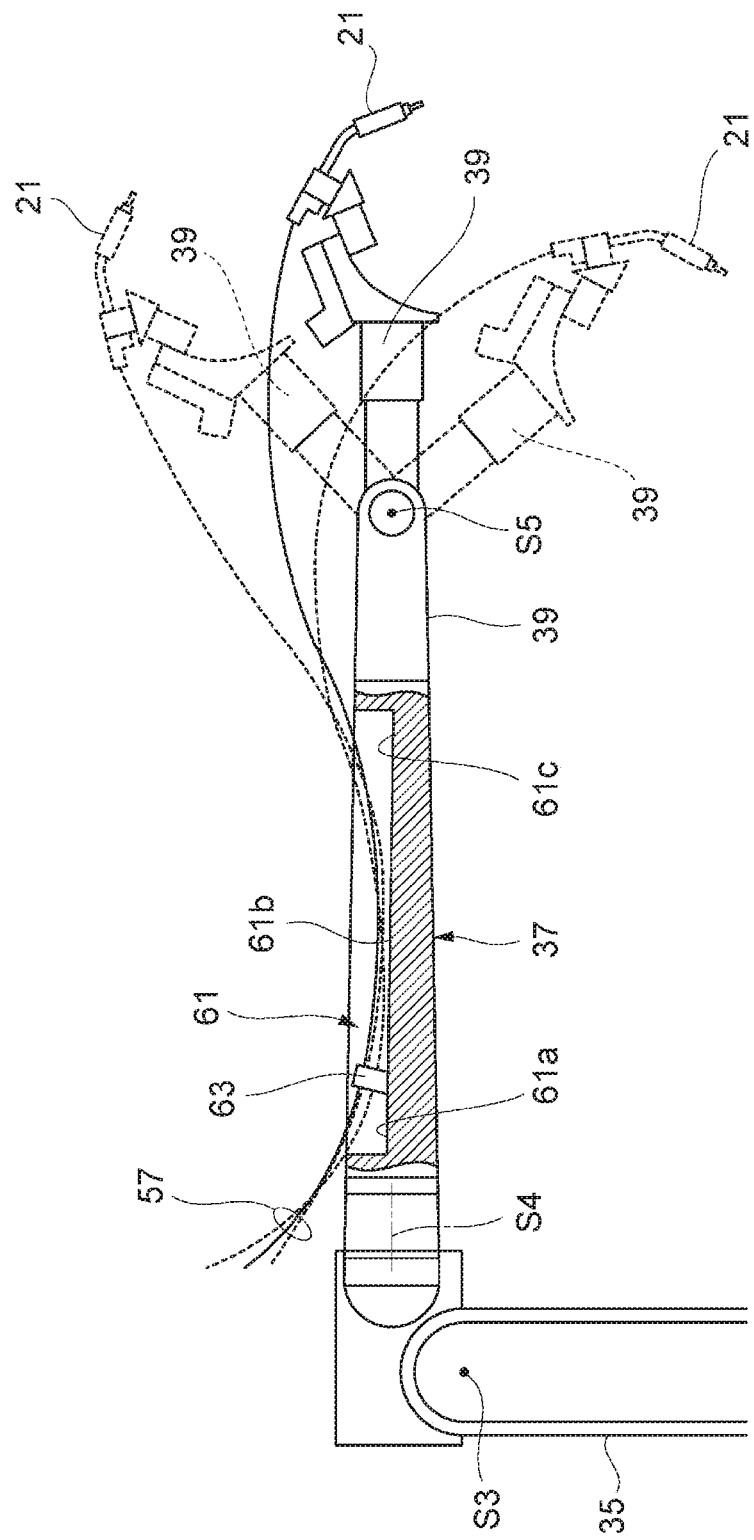
FIG. 6 is an illustrative view schematically showing positions of a torch cable in a depression upon a drive of a wrist swinging portion.

FIG. 6 is an illustrative view schematically showing positions of the torch cable 57 in the depression 61 upon the drive of the wrist swinging portion 39.

When the wrist swinging portion 39 swings about the fifth drive shaft S5, the curvature radius of the curve of the torch cable 57 changes between the depression 61 and the welding torch 21. Therefore, the torch cable 57 rises up from/falls down to the bottom surface 61b of the depression 61 at a distal end side end portion 61c on a side opposite to the proximal end side end portion 61a in the depression 61, and the cable posture changes depending on a swing position of the wrist swinging portion 39. However, the torch cable 57 is supported by the support member 63 at the proximal end side end portion 61a, is energized toward the bottom surface 61b, and is thus not detached from the depression 61 even when a disposed posture thereof changes in the distal end side end portion 61c. That is, only a slight rise from the bottom surface 61b occurs to the torch cable 57 in the distal end side end portion 61c in the depression 61, and a large displacement does not thus occur.

Figure 7:
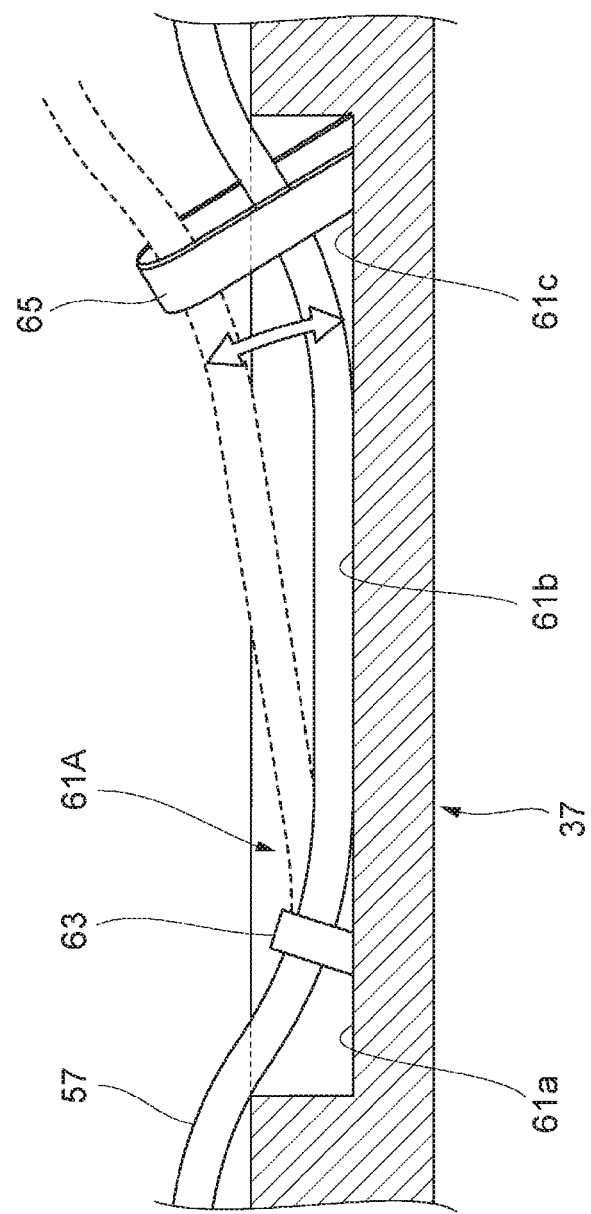
FIG. 7 is a cross sectional view of a depression in which a retaining member for suppressing a rise of the torch cable is provided.

FIG. 7 is a cross sectional view of a depression 61A in which a retaining member for suppressing the rise of the torch cable 57 is provided.

The retaining member 65 is provided in the distal end side end portion 61c of the depression 61A in which the torch cable 57 is disposed on the upper arm 37. The retaining member 65 suppresses the protrusion of the torch cable 57 from the depression 61 even when the rise tends to occur to the torch cable 57 on the side of the distal end side end portion 61c. As a result, interference between peripheral members and the torch cable 57 can be prevented, thereby being capable of preventing the torch cable 57 from being damaged. An annular member such as a tie band can be used as the retaining member 65.

The retaining member 65 is an annular member larger in diameter than the support member 63 so as to be capable of absorbing a displacement of the torch cable 57 in the distal end side end portion 61c of the depression 61A. Moreover, the retaining member 65 may be disposed at a middle position in the longitudinal direction of the depression 61A or on an outer peripheral surface on a side of the wrist swinging portion 39 (refer to FIG. 6) with respect to the distal end side end portion 61c of the depression 61A as well as in the distal end side end portion 61c of the depression 61A.

Cross sectional shapes of the depressions 61 and 61A are not limited to rectangular shapes. Although respective inner wall surfaces in the end portions in the longitudinal direction in the proximal end side end portion 61a and the distal end side end portion 61c of the depressions 61 and 61A are shown as erecting surfaces perpendicular to the arm axis of the upper arm 37 in FIG. 6 and FIG. 7, these inner wall surfaces may be inclined surfaces.

Figure 8:
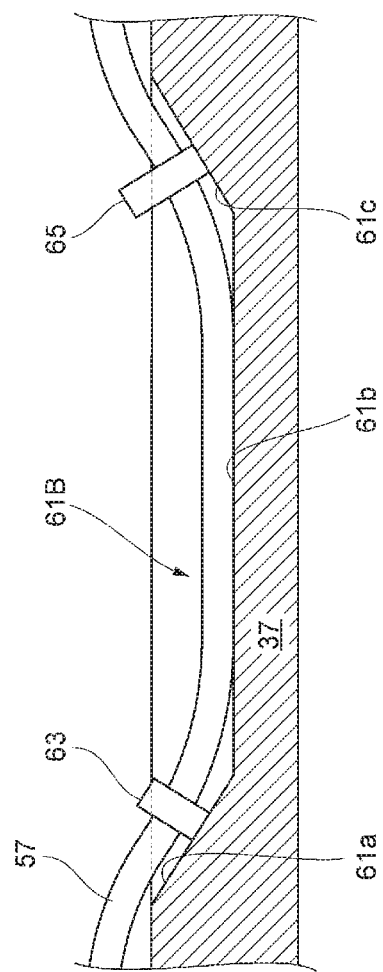
FIG. 8 is a cross sectional view of a depression including inclined surfaces.

FIG. 8 is a cross sectional view of a depression 61B including inclined surfaces.

The inner wall surfaces in the proximal end side end portion 61a and the distal end side end portion 61c are inclined surfaces which gradually shallow from the bottom surface 61b of the depression 61B toward outsides in the axial direction in the depression 61B. In this case, the torch cable 57 is led to the bottom surface 61b while curved more gently than in the case of the erecting surface by attaching the support member 63 to the inclined surface of the proximal end side end portion 61a. As a result, the welding wire is harder to tend to bend. Moreover, the energizing force toward the bottom surface 61b is increased by the elasticity of the curved torch cable 57, and the protrusion of the torch cable 57 from the depression 61B can thus be suppressed.

Further, the torch cable 57 can be disposed along the inclined surface by attaching the retaining member 65 to the inclined surface of the distal end side end portion 61c, thereby being capable of preventing the torch cable 57 from abutting against an edge portion between the depression 61 and the outer peripheral surface of the upper arm 37.

With the articulated welding robot 11 configured as described above, the torch cable 57 is disposed in the depressions 61, 61A, and 61B of the upper arm 37 along the fourth drive shaft S4, which is the arm axial center, and a protruded portion of the torch cable 57 from the outer peripheral surface of the upper arm 37 thus decreases. Moreover, the centrifugal force acting on the torch cable 57 decreases when the robot is driven, and the protrusion of the torch cable 57 from the depressions 61, 61A, and 61B by the centrifugal force is thus also suppressed. As a result, the interference of the torch cable 57 with the workpiece or the members around the robot is harder to occur. Thus, the torch cable 57 is disposed at the arm axial center of the upper arm 37 or in a neighborhood of the arm axial center, and a swing of the torch cable 57 can be suppressed so as to be small even when the upper arm 37 is driven about the fourth drive shaft S4. Moreover, the S4 shaft does not have a hollow structure, and rigidity of the upper arm 37 can be secured sufficiently. Further, the torch cable 57 can be passed through the axial center of the upper arm 37 without forming the S4 shaft into a hollow structure.

Moreover, the disposition of the torch cable 57, which is the composite cable, is not limited to the disposition between the welding torch 21 and the cable adaptor 55, and may be a disposition between the welding torch 21 and the base 31. In this case, a wiring structure can be simplified more.

Second Configuration Example

Figure 9:
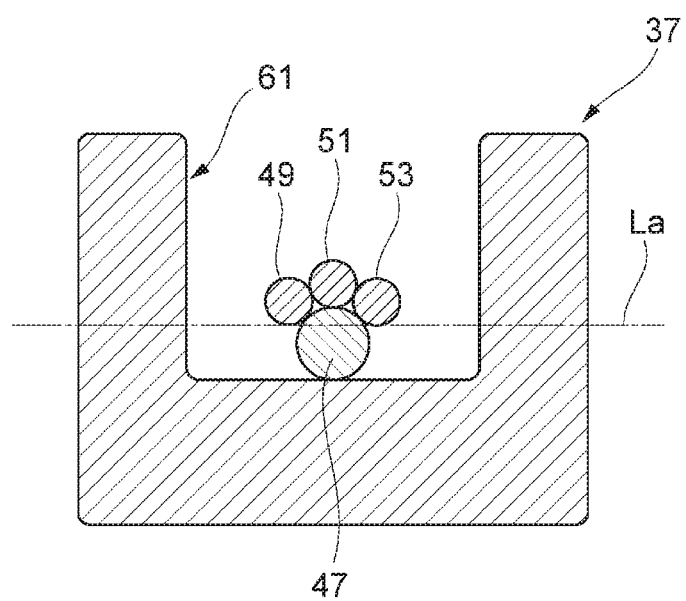
FIG. 9 is a cross sectional view of a second configuration example of the articulated robot corresponding to a cross section taken along the line V-V of the upper arm shown in FIG. 4.

FIG. 9 is a second configuration example of the articulated robot, and a cross sectional view taken along the line V-V of the upper arm 37 shown in FIG. 4. Like members and portions are denoted by like numerals in a description given hereinafter, and a description thereof is simplified or omitted.

The torch cable of articulated robot in this configuration is a conduit cable 47 through which the welding wire is inserted, and the gas hose 49 for supplying the shielding gas, the cooling water hose 51 for supplying the cooling water, and the power cable 53 are provided in the depression 61 independently of the conduit cable 47.

The diameter of the torch cable (conduit cable 47) is reduced in the above-mentioned configuration compared with the first configuration example, and the elastic force of the torch cable itself can be suppressed so as to be small. Therefore, the conduit cable 47 itself flexibly deforms and moves in response to an external force, and the curvature radius of a curve generated as a result can be suppressed so as to be small. As a result, such a configuration that the bending tendency of the inserted welding wire is harder to occur can be provided.

Third Configuration Example

Figure 10:
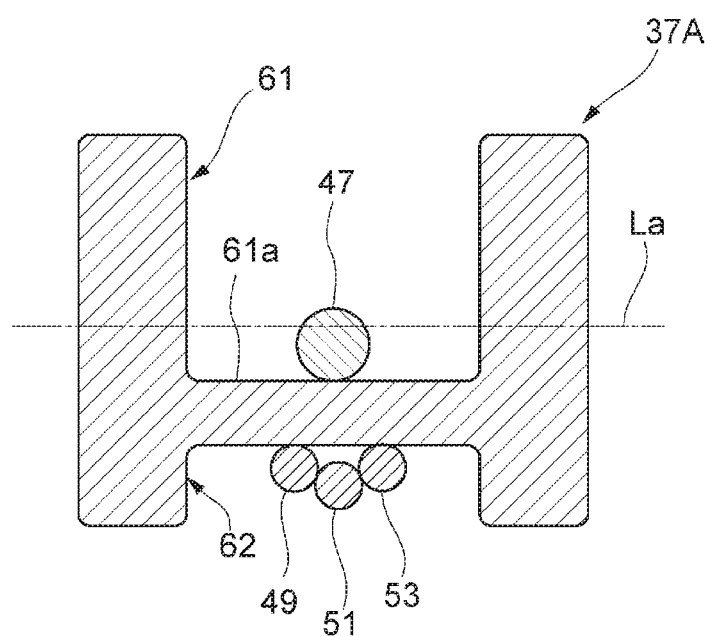
FIG. 10 is a cross sectional view of a third configuration example of the articulated robot corresponding to the cross section taken along the line V-V of the upper arm shown in FIG. 4.

FIG. 10 is a cross sectional view of a third configuration example of the articulated robot corresponding to the cross section taken along the line V-V of the upper arm shown in FIG. 4.

The depression 61 as described before is formed in the upper arm 37A of the articulated robot in this configuration. Moreover, an opposed-side depression 62 hollowed toward the arm axial center is formed on an opposite side of a forming side of the depression 61 on the arm outer periphery so that bottom surfaces are opposed to each other. That is, the upper arm 37A is formed to have the cross section in an H shape orthogonal to a longitudinal direction by the pair of the depression 61 and the opposed-side depression 62.

The conduit cable 47 through which the welding wire is inserted is accommodated in the depression 61, and the gas hose 49, the cooling water hose 51, the power cable 53, and the like are accommodated in the opposed-side depression 62 in the illustrated example.

The cables and the hoses accommodated in the pair of the depression 61 and the opposed-side depression 62 are not limited to the above-mentioned example. For example, the gas hose 49, the cooling water hose 51, and the power cable 53 may be appropriately combined and disposed in a distributed manner respectively in the depression 61 and the opposed-side depression 62.

With the above-mentioned configuration, the upper arm 37A is hollowed more than that in the case of the first configuration example, the weight of the upper arm 37A can thus be reduced, and an inertial force is suppressed, which is advantageous for a high-speed operation. Further, a degree of freedom in disposition of the respective cables, hoses, and the like are increased.

Fourth Configuration Example

FIG. 11 is a cross sectional view of a fourth configuration example of the articulated robot corresponding to the cross section taken along the line V-V of the upper arm shown in FIG. 4.

An insertion hole 67 is formed in place of the opposed-side depression 62 in the third configuration example in an upper arm 37B of the articulated robot in this configuration. The conduit cable 47 is accommodated in the depression 61, and the gas hose 49, the cooling water hose 51, the power cable 53, and the like are accommodated in the insertion hole 67.

The cables and the hoses accommodated in the depression 61 and the insertion hole 67 are not limited to the above mentioned example, and may also be arbitrarily combined in this configuration.

With this configuration, the weight reduction can be achieved by hollowing out the upper arm 37B, and the inertial force can be suppressed during the drive of the upper arm 37B, resulting in the configuration advantageous for a high speed movement. Moreover, the gas hose 49, the cooling water hose 51, the power cable 53, and the like are disposed in the insertion hole 67, and the respective hoses and cables are protected, and are thus not damaged from the outside.

In such a way, the present invention is not limited to the above embodiment. However, combinations of the configurations of the embodiment and changes and applications by those skilled in the art based on the description and the known techniques are also expected by the present invention and included in the range to seek protections.

Figure 12:
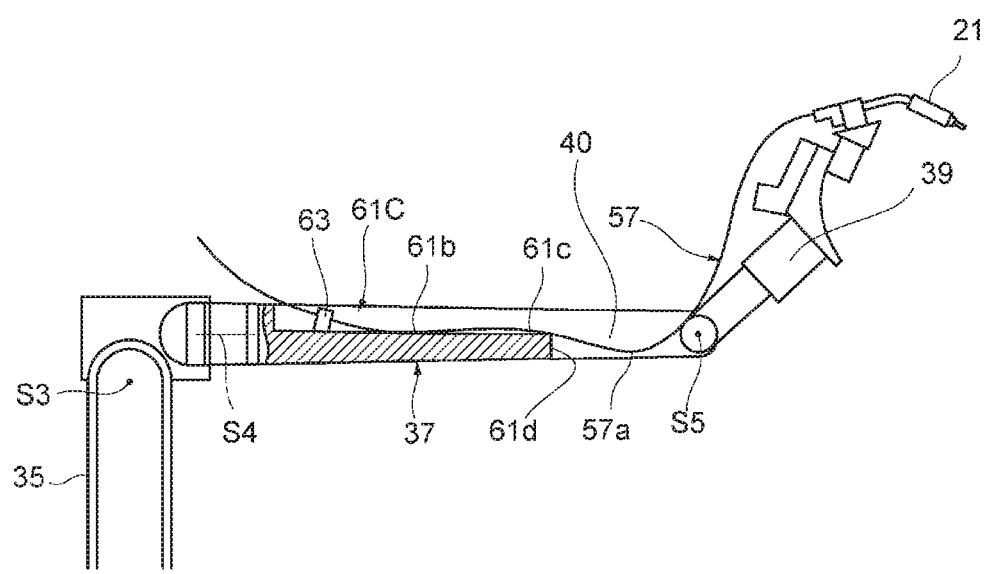
FIG. 12 is a partial cross sectional view of the articulated robot showing another configuration example of the depression provided in the upper arm part.

For example, an opening portion 40 passing through in a depth direction of a depression 61C may be formed in a neighborhood of the wrist swinging portion 39 of the distal end side end portion 61c of the depression 61C in the upper arm 37 as shown in FIG. 12. In this case, the torch cable 57 extending toward the wrist swinging portion 39 is inserted into the opening portion 40, and the posture of the torch cable 57 changed by the swing of the wrist swinging portion 39 is absorbed in this opening portion 40. That is, the torch cable 57 disposed along the depression 61C enters from the end portion 61d into the opening portion 40, thereby forming a loop portion 57a. The drawing-out of the torch cable 57 from the depression 61C toward the welding torch 21 or the drawing-in of the torch cable 57 into the opening portion 40 are facilitated by the loop portion 57a, thereby suppressing the protrusion of the torch cable 57 to the outside of the upper arm 37. As a result, even when the posture of the torch cable 57 is largely changed by the swing of the wrist swinging portion 39, the torch cable 57 is not detached from the depression 61C, and the wrist swinging portion 39 can be driven at a low resistance. Moreover, the torch cable 57 can be prevented from being curved at a small curvature radius.

Figure 13:
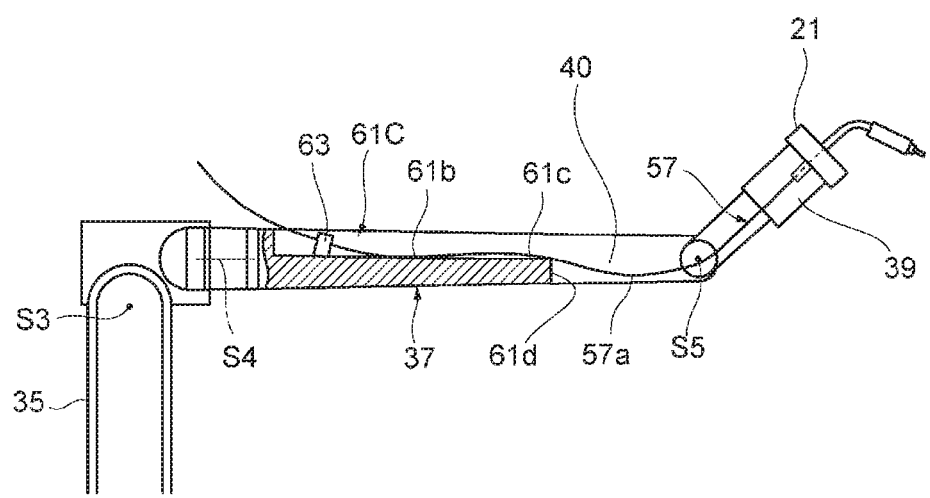
FIG. 13 is a partial cross sectional view of the articulated robot showing another configuration example of the depression provided in the upper arm part.

Moreover, there may be provided such a configuration that the torch cable 57 is inserted through an inside of the wrist swinging portion 39 in the distal end side end portion 61c of the depression 61C as shown in FIG. 13. The torch cable 57 can easily be passed through the inside of the wrist swinging portion 39 in such a configuration that the torch cable 57 passes at the axial center of the upper arm 37 in the depression 61. It should be noted that the opening portion 40 may not be formed.

The present application is based on Japanese Patent Application (Japanese Patent Application No. 2017-17112) filed on Feb. 1, 2017, and the contents thereof are incorporated herein by reference.

EXPLANATION OF REFERENCE NUMERALS

11: Articulated welding robot
33: Swinging portion
37, 37A, 37B: Upper arm
47: Conduit cable
49: Gas hose
51: Cooling water hose
53: Power cable
57: Torch cable
61, 61A: Depression
61a: Proximal end side end portion
61b: Bottom surface
62: Opposed-side depression
63: Support member
65: Retaining member
67: Insertion hole
100: Welding system

The invention claimed is:

1. An articulated welding robot, comprising:
an articulated arm in which a plurality of arm parts are linked via drive shafts, wherein
a welding wire inserted through a conduit cable is disposed along at least any of the arm parts,
a depression hollowed toward an arm axial center is formed in at least a part of an arm outer periphery of the at least any of the arm parts,
at least a part of the conduit cable is accommodated the depression,
the conduit cable is disposed on an outside of the arm outer periphery at a proximal end side of the at least any of the arm parts and is curved from the outside of the arm outer periphery into an inside of the depression, and
a support member configured to support the conduit cable is provided on an inclined surface at a proximal end side end portion of the depression, the support member being configured to introduce the conduit cable from the proximal end side of the at least any of the arm parts to the depression with respect to the arm axial center.

2. The articulated welding robot according to claim 1, wherein
a drive shaft for rotating the arm part in which the depression is formed about the arm axial center is connected to the arm part, and
a bottom surface of the depression is formed at a depth from the arm outer periphery of the arm part to the arm axial center.

3. The articulated welding robot according to claim 1, wherein the depression is formed along the arm axial center.

4. The articulated welding robot according to claim 1, wherein an opposed-side depression hollowed toward the arm axial center is formed on an opposite side of a forming side of the depression on the arm outer periphery in the arm part in which the depression is formed.

5. The articulated welding robot according to claim 3, wherein an opposed-side depression hollowed toward the arm axial center is formed on an opposite side of a forming side of the depression on the arm outer periphery in the arm part in which the depression is formed.

6. The articulated welding robot according to claim 1, wherein the conduit cable is inserted through one composite cable containing at least any of a gas hose for supplying shielding gas, a cooling water hose for circulating cooling water, and a power cable for supplying a welding current.

* * * * *